US008805444B2

(12) United States Patent
Han et al.

(10) Patent No.: US 8,805,444 B2
(45) Date of Patent: Aug. 12, 2014

(54) MULTI-SIM MULTI-STANDBY COMMUNICATION TERMINAL, AND SYNCHRONIZATION DEVICE AND METHOD THEREOF

(75) Inventors: Wei Han, Shanghai (CN); Xianliang Chen, Shanghai (CN)

(73) Assignee: Spreadtrum Communications (Shanghai) Co., Ltd., Shanghai (CN)

( * ) Notice: Subject to any disclaimer, the term of this patent is extended or adjusted under 35 U.S.C. 154(b) by 0 days.

(21) Appl. No.: 13/575,560

(22) PCT Filed: Jun. 8, 2011

(86) PCT No.: PCT/CN2011/075427
§ 371 (c)(1),
(2), (4) Date: Jul. 26, 2012

(87) PCT Pub. No.: WO2012/109830
PCT Pub. Date: Aug. 23, 2012

(65) Prior Publication Data
US 2013/0157662 A1     Jun. 20, 2013

(51) Int. Cl.
*H04M 1/00* (2006.01)
*H04B 1/38* (2006.01)
*H04W 48/18* (2009.01)
*H04W 56/00* (2009.01)
*H04W 52/02* (2009.01)
*H04W 88/06* (2009.01)
*H04W 48/20* (2009.01)

(52) U.S. Cl.
CPC ............. *H04W 56/00* (2013.01); *H04W 88/06* (2013.01); *H04W 48/20* (2013.01); *H04W 48/18* (2013.01); *H04W 52/0229* (2013.01); *Y02B 60/50* (2013.01)
USPC ...................................... 455/558; 455/435.2

(58) Field of Classification Search
CPC ..... H04W 48/18; H04W 48/20; H04W 52/00; H04W 56/00; H04W 88/06
USPC ........ 455/558, 450, 552.1, 435.2, 552, 412.1, 455/436, 422.1
See application file for complete search history.

(56) References Cited

U.S. PATENT DOCUMENTS 6,603,982 B1 * 8/2003 Muller .......................... 455/558
8,406,741 B2 * 3/2013 Kang et al. ................. 455/412.1
(Continued)

FOREIGN PATENT DOCUMENTS

CN          1976514 A       6/2007
CN        101217739 A       7/2008
(Continued)

OTHER PUBLICATIONS

European Search Report for a European counterpart application 11858782.3, issued on Mar. 3, 2014.

*Primary Examiner* — Kashif Siddiqui
(74) *Attorney, Agent, or Firm* — Kilpatrick Townsend & Stockton LLP (57) ABSTRACT

A multi-SIM multi-standby communication terminal, and a synchronization device and method thereof are provided. The synchronization method includes: searching, by the first card, for a network and camping on a first cell after the communication terminal is powered on; controlling the second card to camp on the first cell; determining, by the first card, if there is a second cell qualified for reselection based on the result of neighboring cells measurement, and if the determination result is YES, the first card reselecting the second cell; and controlling the second card to reselect the second cell after the first card camps on the second cell. This disclosure has the following advantages: the efficiency of paging information reception and neighboring cells measurement is increased, power consumption is reduced, the time for camping on and cell reselection is reduced, and the implementation of the physical layer is simplified.

19 Claims, 4 Drawing Sheets

(56) References Cited

U.S. PATENT DOCUMENTS

| | | |
|---|---|---|
| 2003/0125073 A1* | 7/2003 | Tsai et al. ............... 455/552 |
| 2008/0020765 A1* | 1/2008 | Black et al. ............ 455/435.2 |
| 2009/0093217 A1 | 4/2009 | Shin |
| 2009/0215473 A1 | 8/2009 | Hsu |
| 2009/0312020 A1* | 12/2009 | Lee ....................... 455/435.2 |
| 2010/0075716 A1 | 3/2010 | Chang et al. |
| 2010/0279698 A1* | 11/2010 | Wong ..................... 455/450 |
| 2010/0304782 A1* | 12/2010 | Chang et al. ............ 455/552.1 |

FOREIGN PATENT DOCUMENTS

| | | |
|---|---|---|
| CN | 101217743 A | 7/2008 |
| CN | 101951287 A | 1/2011 |
| WO | 2010140781 A2 | 12/2010 |

* cited by examiner

MULTI-SIM MULTI-STANDBY COMMUNICATION TERMINAL, AND SYNCHRONIZATION DEVICE AND METHOD THEREOF

CROSS REFERENCE TO RELATED APPLICATIONS

This application is a Section 371 National Stage Application of International Application No. PCT/CN2011/075427, filed on Jun. 8, 2011, the entire contents of which are incorporated herein by reference in their entirety.

FIELD OF THE DISCLOSURE

The present disclosure generally relates to mobile communication field, and more particularly, to a multi-SIM multi-standby communication terminal, and a synchronization device and a synchronization method thereof.

BACKGROUND OF THE DISCLOSURE

With the rapid development of communication technology, information exchange among people appears more and more frequently. A single mobile communication terminal, such as a mobile phone or a vehicle-mounted mobile terminal may not meet the needs of people, especially those engaged in marketing or management, who may have to carry two or more mobile terminals to meet the communication requirements, which brings inconvenience. Nowadays, multi-SIM communication terminals are emerging, which makes a user only need to carry one communication device with more than one card, such as Subscriber Identity Module (SIM) cards or Universal Subscriber Identity Module (USIM) cards. It is far more convenient than the conventional way to carry several mobile terminals.

In general, if a subscriber wants to use multiple phone numbers in a single mobile terminal, the following solutions may be employed.

Firstly, a multi-SIM single-standby communication terminal may be used. In this communication terminal, there is more than one card simultaneously, however, only one card can be used (be set in a standby state) at the same time, and switching among the multiple cards is executed by hardware circuits, which is generally selected when the device is powered on. Due to the effect of a protocol stack, the switching among the multiple cards can not be executed dynamically when the communication device is in operation. For this matter, the mobile phone system needs to be rebooted (mainly reboot protocol stack or upper-layer software) to switch among the multiple cards.

Secondly, a multi-SIM multi-standby communication device may be used to overcome the disadvantages in the multi-SIM single-standby communication device, in which multiple cards can be standby simultaneously and in-coming calls of the multiple cards can be received simultaneously, just like carrying multiple mobile terminals with a single card, thereby improving practical application greatly.

An early multi-SIM multi-standby communication terminal actually possesses multiple sets of systems, generally two, each of which has a radio frequency (RF) transceiver module, a baseband processing module, and a protocol stack respectively. The communication device having multiple systems can realize multiple SIM cards respectively in standby or communicating state, which is also referred to as a multi-SIM multi-standby multi-communicating communication device. However, this kind of communication terminal, with multiple systems utilized, suffers an additional cost and power consumption, and a larger size, which causes inconvenience. In view of radio frequency modules, allowing for co-channel interferences, one radio frequency (RF) module is generally configured at the top of a mobile phone, and the other one is configured at the end of the mobile terminal, so as to reduce interferences. Generally, the distance between the two antennae is greater than 100 mm.

Later multi-SIM multi-standby mobile terminal is a kind of multi-SIM multi-standby single-communicating communication device, which uses only one set of communication module, compared to the early multiple systems. Because the upper protocol stacks needs to cooperate, the protocol stacks which operate independently in the early multi-SIM multi-standby multi-communicating communication device needs a close integration. Although the practical operation becomes more complicated, the multi-SIM multi-standby function may be achieved.

As for the conventional multi-SIM multi-standby mobile terminal, upon being powered on, the multiple cards search for a network and camp on a cell independently. Therefore, multiple cards may camp on multiple different cells at the same time.

Even if multiple cards have the possibility to camp on an identical cell, neighbouring cells measurement and cell reselection are performed independently. That is, some of the multiple cards may reselect a new cell, while some of the multiple cards still camp on the original cell. As a result, the multiple cards may still camp on multiple different cells.

As for multi-SIM multi-standby single-communicating communication device, due to one set of communication module, paging information reception and neighbouring cells measurement can only be time-division switched in turn for each cell. In the event that multiple cards camp on multiple different cells, the efficiency of paging information reception is inverse proportional to the number of cards in standby states. The chance of neighbouring cells measurement is reduced with the increase of the number of cards in standby states.

With regard to power consumption, because each card camps on different cell independently, and paging information reception and neighbouring cells measurement need to be time-division switched in turn for each cell, the idle time is much shorter than that of the single-standby communication terminal, which thereby causes higher power consumption.

SUMMARY

The problem to be solved in the present disclosure is that the conventional multi-SIM multi-standby communication terminal has lower efficiency for paging information reception and neighbouring cells measurement, and higher power consumption.

To solve the problems described above, embodiments of the present disclosure provide a synchronization method used in a multi-SIM multi-standby communication terminal. The synchronization method includes: after a first card camps on a cell, a second card is controlled to camp on the cell with the first card, and the second card is suitable for camping on a same cell as the first card.

Optionally, the method further includes:
searching, by the first card, for a network and camping on a first cell after the communication terminal is powered on;
controlling the second card to camp on the first cell;
determining, by the first card, if there is a second cell qualified for reselection based on the result of neighboring cells measurement, and if the determination result is YES, the first card reselecting the second cell; and controlling the second card to reselect the second cell after the first card camps on the second cell.

Optionally, the method further includes:

determining, by the first card, if there is a second cell qualified for reselection based on the result of neighboring cells measurement, and if the determination result is YES, the first card reselecting the second cell; and controlling the second card to reselect the second cell after the first card camping on the second cell.

Optionally, the first card receives and stores system information when the first card camps on a cell; and controlling the second card to camp on the cell with the first card comprises controlling the second card to access the stored system information.

To solve the above problems, embodiments of the present disclosure further provide a synchronization device in a multi-SIM multi-standby communication terminal. The synchronization device includes:

a determining unit, adapted to identify a first card, and to determine if there is a second card within the remaining cards which is suitable for camping on a same cell as the first card; and a control unit, after the first card camps on a cell and if the determination result of the determining unit is YES, adapted to control the second card to camp on the cell with the first card.

Optionally, the control unit includes a reselection control unit, after the first card reselects and camps on a second cell, and if the determination result of the determining unit is YES, adapted to control the second card to reselect the second cell.

Optionally, the control unit includes a power-on control unit, after the first card searches for a network and camps on a first cell, and if the determination result of the determining unit is YES, adapted to control the second card to camp on the first cell.

Optionally, the synchronization device further includes a storage unit, adapted to store system information that is received by the first card when the first card camps on a cell; and the control unit is further adapted to control the second card to access the stored system information when the second card camps on the cell with the first card.

Optionally, the control unit is further adapted to control the second card to camp on another cell if the determination result of the determining unit is NO.

Embodiments of the present disclosure further provide a multi-SIM multi-standby communication terminal which includes the synchronization device according to the above described embodiments of the present disclosure.

Optionally, the communication terminal further includes a baseband processing chip and a radio frequency chip, and the synchronization device is embedded in the baseband processing chip.

Optionally, the multi-SIM multi-standby communication terminal is a dual-SIM dual-standby communication terminal.

If it is determined that multiple cards are able to camp on a same cell, the multiple cards are forced to camp on the same cell according to embodiments of this disclosure. Compared with the prior art, embodiments of this disclosure have the following advantages:

The paging information of the multiple cards which camp on a same cell can be received simultaneously, which is respectively informed each of the multiple cards. Compared with the prior art that the paging information is time-division switched in turn for each cell, the efficiency of paging information reception is increased, loss of the paging information is avoided. In addition, because there is no need for paging information reception in time-division mode at different cells, the idle time of the communication terminal is increased, which causes lower power consumption correspondingly.

Further, the information of neighboring cells measurement can be shared by the multiple cards which camp on a same cell. By measuring the neighboring cell of the same cell uniformly by the physical layer, the measurement result may be reported to a first card merely. Compared with the prior art that the neighboring cells measurement is time-division switched in turn for each cell, the efficiency of measurement is increased. In addition, because there is no need for neighboring cells measurement in time-division mode at different cells, the idle time of the communication terminal is increased, which causes lower power consumption correspondingly.

The first card can receive and store system information during camping on a cell. The other cards which camp on the same cell as the first card can access the stored system information directly, without need for receiving the system information again, which thereby reduces the time for camping on the cell remarkably.

DETAILED DESCRIPTION OF THE DISCLOSURE

According to a multi-SIM multi-standby communication terminal provided in embodiments of the present disclosure, multiple cards in the communication terminal can be synchronized and forced to camp on a same cell, which enables the multiple cards to share the cell information, such as system information, results of neighbouring cells measurement and the like, and to receive paging information simultaneously.

A synchronization method used in a multi-SIM multi-standby communication terminal provided in an embodiment of the present disclosure includes: after a first card camps on a cell, a second card is controlled to camp on the cell with the first card. The second card is a card which is suitable for camping on a same cell as the first card.

Correspondingly, a synchronization device used in a multi-SIM multi-standby communication terminal provided in an embodiment of the present disclosure includes a determining unit and a control unit. The determining unit is adapted to identify a first card, and to determine if there is a second card within the remaining cards which is suitable for camping on a same cell as the first card. The control unit is adapted, after the first card camps on a cell and if the determination result of the determining unit is YES, to control the second card to camp on the cell with the first card.

The first card is the one which firstly searches for a network and camps on a cell successfully after the communication terminal is powered on. Specifically, when the communication terminal is powered on, all the cards installed in the communication terminal begin to search for a network and try to camp on a cell respectively, and the one which camps on a cell successfully earliest is identified to be the first card. If the cell that the first card camps on is not suitable for the other cards to camp on, the card which camps on a cell subsequently may be identified to be the first card.

The first card may be a preassigned card. Specifically, when the communication terminal is powered on, one card of the multiple cards installed in the communication terminal is preassigned to search for a network and camp on a cell.

The first card may be referred to as a main card. If there are other cards which camp on the same cell as the main card subsequently, the main card receives and stores the cell's system information, and the other cards may access the stored system information directly. In addition, results of neighbouring cells measurement may only be reported to the main card, and the other cards may share the measurement results with the main card. Further, if the multiple cards are synchronized in the same cell after the communication terminal is powered on, cell reselection of the multiple cards may be synchronized. That is, when the main card reselects a cell, the other cards may reselect and camp on the same cell as the main card.

The synchronization device and method provided in the embodiments of the present disclosure may be applicable to various communication modes, such as a Time Division Synchronous Code Division Multiple Access (TD-SCDMA) network, a Wideband Code Division Multiple Access (WCDMA) network, a Code Division Multiple Access (CDMA) network, a Global System for Mobile Communication (GSM) network, a Long Term Evolution (LTE) network, and the like.

Specifically, the second card which is suitable for camping on a same cell as the first card should comply with any one of the following six conditions.

(1) The second card belongs to a same operator as the first card.

(2) The Public Land Mobile Network Identifiers (PLMN ID, which is used to identify the operators and is referred to as network number hereinafter) of the cell which the first card camps on is contained in the Equivalent Home PLMN (EHPLMN, wherein HPLMN means a PLMN that a card belongs to) list of the second card.

(3) The network number of the cell which the first card camps on is contained in the Equivalent PLMN (EPLMN) list of the second card.

(4) The network number of the cell which the first card camps on is the Registered PLMN (RPLMN, which is the PLMN that the card registered successfully last time, and may be HPLMN, EHPLMN or EPLMN, or any PLMN that the card is permitted to roam) of the second card.

(5) The second card can not camp on any other cell normally (namely, fails to camp on any other cell).

(6) The registration or initiating a service by the second card is rejected by a cell's network (e.g., payment in arrears or other reasons causing failing to camp), in this case, the cell that the first card camps on may provide a restricted service for the second card.

In a certain country or area, a cellular mobile communication network with a certain communication mode provided by an operator is referred to as PLMN. PLMN is established and operated by the government or an authorized operator, which is provided for the public with land mobile communication service. The PLMN can be connected and communicated with other communication networks, such as a Public Switched Telephone Network (PSTN), which thereby forms an area-sized or country-sized communication network. In the mainland China, there are three PLMNs at present, which includes Global System for Mobile Communication/General Packet Radio Service/Enhanced Data Rate for GSM Evolution (GSM/GPRS/EDGE) of China Mobile, GSM/GPRS of China Unicom, and Code Division Multiple Access 1X (CDMA-1X) of China Telecom.

PLMN can be used to distinguish various operators or networks having different modes which belong to a same operator, for example, to distinguish China Mobile from China Unicom, to distinguish TD-SCDMA network from GSM network of China Mobile, and to distinguish WCDMA network from GSM network of China Unicom. In fact, for a commonly used mobile phone, the icon "2G" or "3G" may be showed on the display of the mobile phone by identifying PLMN. The second Generation network (2G) mainly includes GSM, and CDMA-1X network, and the third Generation network (3G) mainly includes TD-SCDMA, and WCDMA network. The LTE system is developed based on the evolution of TD-SCDMA or WCDMA network.

According to the relationship between PLMN and the card in a terminal, PLMN may be divided into: HPLMN, EHPLMN, EPLMN, and RPLMN. For example, as for China Mobile, PLMN of TD-SCDMA is equivalent to EPLMN of GSM. For simplicity, a mobile phone camping on GSM is equivalent to camping on TD-SCDMA of China Mobile, that is, the billing policies of calls, short messages, or permitted services in GSM are identical with those in TD-SCDMA of China Mobile. As for a SIM card or USIM card provided by China Mobile, GSM of China Mobile is its HPLMN, and TD-SCDMA is its EHPLMN. RPLMN is the last registered PLMN.

Embodiments of the present disclosure will be described in detail in conjunction with the accompanying drawings. In the following embodiments, a dual-SIM dual-standby mobile phone is taken as an example, which includes two cards: a card 1 and a card 2.

Embodiment One

Figure 1:
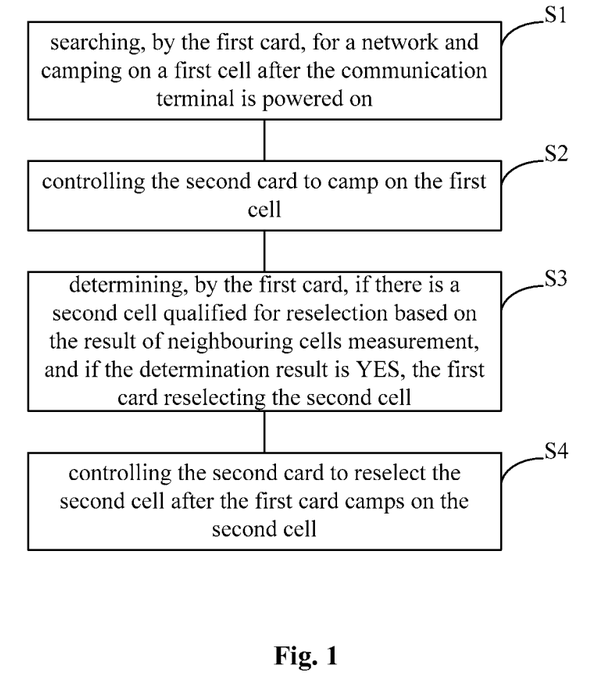
FIG. 1 is a schematic flow chart of a synchronization method in a multi-SIM multi-standby communication terminal according to a first embodiment of the present disclosure.

FIG. 1 is a schematic flow chart of a synchronization method in a multi-SIM multi-standby communication terminal according to a first embodiment of the present disclosure. Referring to FIG. 1, the synchronization method includes steps of S1, S2, S3 and S4.

In step S1, the first card searches for a network and camps on a first cell after the communication terminal is powered on.

In step S2, the second card is controlled to camp on the first cell.

In step S3, the first card determines if there is a second cell qualified for reselection based on the result of neighbouring cells measurement, and if the determination result is YES, the first card reselects the second cell; and In step S4, the second card is controlled to reselect the second cell after the first card camps on the second cell.

The steps S1 and S2 are performed to achieve synchronization of the two cards in a same cell in the process of power on. And the steps S3 and S4 are performed to achieve synchronization of the two cards in a reselection cell in the process of reselection.

Figure 2:
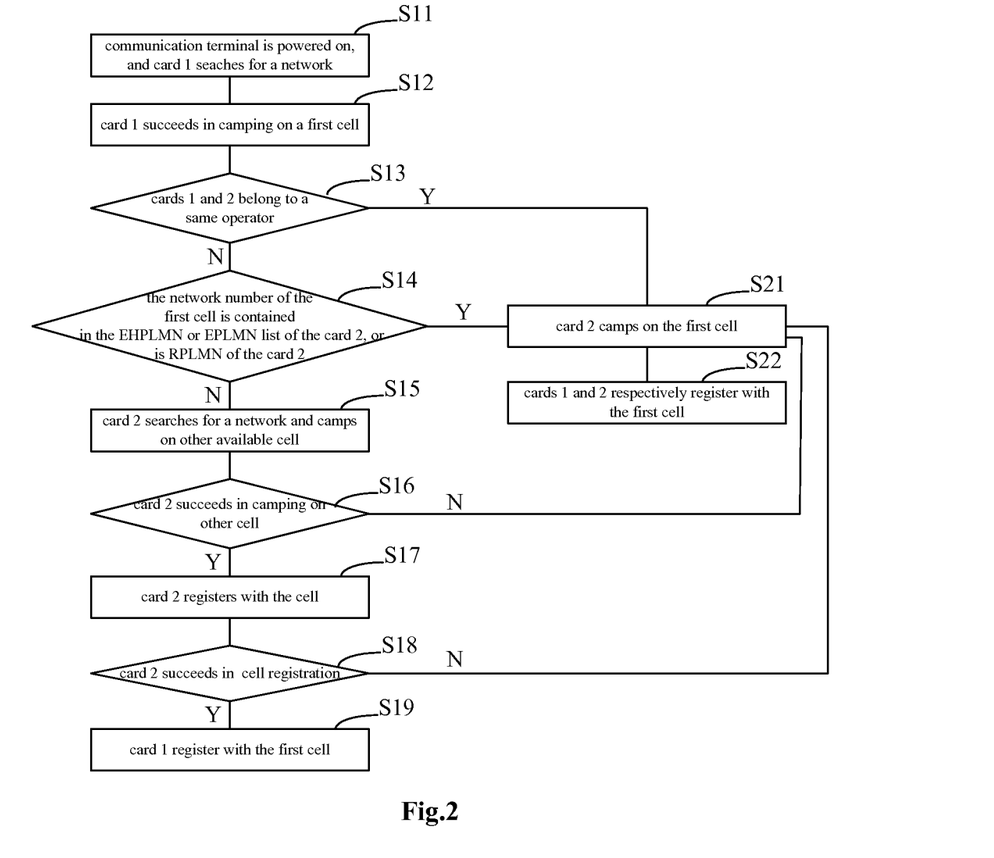
FIG. 2 is a schematic flow chart illustrating a power-on process of a synchronization method in a multi-SIM multi-standby communication terminal according to the first embodiment of the present disclosure.

FIG. 2 is a schematic flow chart illustrating a power-on process of a synchronization method in a multi-SIM multi-standby communication terminal according to the first embodiment of the present disclosure, which takes the two cards in a dual-SIM dual-standby mobile phone as an example.

Firstly, in step S11, the mobile phone is powered on and the card 1 searches for a network. In this embodiment, the card 1 is preassigned to search for a network first when the mobile phone is powered on. Thus, although there is only a single communication module in a multi-SIM multi-standby single-communicating communication device, there is no need for time-division switching for the two cards to take turns to search for networks, which thereby speeds up the search process.

The search process includes:

(a) Measuring Received Signal Strength Indication (RSSI) of all the frequencies in the frequency band that the mobile phone occupies. Specifically, by scanning all the frequencies in the frequency band in accordance with the communication mode that the mobile phone supports, RSSI of all the frequencies is measured.

(b) Determining if there is a frequency which needs to perform cell search. If the determination result is YES, the process proceeds to step (c), and if NO, the search process is finished. If RSSI is greater than the predetermined threshold value (e.g., −108 dbm), the frequency needs to perform cell search. Otherwise, there is no cell suitable for camping on, that is, the search process fails.

(c) Selecting a frequency in the descending order of RSSI to perform cell search. If the cell search is successful, the process proceeds to step (d), and if NO, the process proceeds to select another frequency to perform cell search. Specifically, all the frequencies which need to perform cell search are ranged in the descending order of RSSI. Firstly, the frequency having the highest signal strength is selected to perform cell search. If the mobile phone receives cell synchronization information (as for GSM, it is transmitted on Synchronization Channel (SCH); as for TD-SCDMA, it is transmitted on Primary Common Control Channel (P-CCPCH); and as for WCDMA, it is transmitted on Common Pilot Channel (CPICH)), it is considered that the cell is searched out, that is, the cell search is successful, then the process proceeds to the step (d). If the cell search at the frequency having the highest signal strength fails, the cell search will be performed at the frequency having the second-highest signal strength. The cell search will be performed repeated until it is successful, or until it fails at all the frequencies which need to perform cell search.

(d) Attempting to camp on the cell which has been searched out. If camp-on process succeeds in camping on the cell, the search process is finished, otherwise, the process proceeds to the step (b). The camp-on process includes:

(d1) Receiving the cell's system information. Specifically, the mobile phone monitors the cell's Broadcast Control Channel (BCCH) and receives common information transmitted on the BCCH, namely system information.

(d2) If the system information is received successfully, the process proceeds to step (d3), otherwise, the camp-on process fails. Specifically, the mobile phone receives all the system information on the BCCH and stores them in the card 1, then the process proceeds to the step (d3). Otherwise, the camp-on process fails.

(d3) If the received signal strength in the cell (as for GSM, it is RSSI; as for TD-SCDMA or WCDMA, it is Received Signal Code Power (RSCP)) conforms to the minimum access threshold that is required by the network, if the location of the cell is not prohibited, if the cell is not barred, and if the network number of the cell belongs to the operator's network that the card 1 belongs to (namely, the cell can be camped on), the camp-on process succeeds; otherwise, the camp-on process fails.

In step S12, the card 1 succeeds in camping on a first cell, then the process proceeds to step S13. In this embodiment, the card 1 is assigned to search for a network first when the communication terminal is powered on. If the card 1 succeeds in camping on a cell, the card 1 is identified to be the first card, and the cell that the card 1 camps on is identified to be the first cell. Alternatively, if the card 1 fails to search for a network and camp on a cell, the card 2 is controlled to search for a network. If the card 2 succeeds in camping on a cell, the card 2 is identified to be the first card, and the cell that the card 2 camps on is identified to be the first cell. In an optional embodiment, the card 2 may be assigned to search for a network firstly. In another optional embodiment, the card 1 and card 2 may begin to search for a network simultaneously, the one which succeeds in camping on a cell first is identified to be the first card, and the cell is identified to be the first cell correspondingly.

In step S13, if the card 2 belongs to a same operator as the card 1 is determined. If the determination result is YES, the process proceeds to step S21, and if NO, the process proceeds to step S14. Specifically, by reading International Mobile Subscriber Identity (IMSI) of the card 1 and card 2, it can be determined if the two cards belong to a same operator. If the two cards belong to a same operator, the card 2 is controlled to camp on the same cell as the card 1, that is, the card 2 camps on the first cell. If the two cards belong to different operators, the process continues to determine if the card 2 conforms to the other conditions that the card 2 may camp on the same cell as the card 1.

In step S14, if the network number of the first cell is contained in the EHPLMN or EPLMN list of the card 2, or if the network number of the first cell is RPLMN of the card 2 is determined. If the determination result is YES, the process proceeds to step S21, and if NO, the process proceeds to step S15. If the two cards belong to different operators, the process continues to determine if the card 2 conforms to other conditions that the card 2 may be controlled to camp on the same cell as the card 1, such as if the network number of the first cell is contained in the EHPLMN or EPLMN list of the card 2, or if the network number of the first cell is RPLMN of the card 2. The network number of the first cell may be obtained by reading the system information that the card 1 receives on the BCCH. The EHPLMN list of the card 2 may be obtained by reading the card 2, which may be obtained by reading the non-volatile RAM (which is abbreviated as NV, and is used to retain the information to be required by the mobile phone after being powered on next time) in the mobile phone. The RPLMN of the card 2 is the last registered network, which may be obtained by reading the card 2. If the network number of the first cell is contained in the EHPLMN or EPLMN list of the card 2, or if the network number of the first cell is the RPLMN of the card 2, the card 2 is controlled to camp on the same cell as the card 1, that is, the card 2 camps on the first cell. If the network number of the first cell is not contained in the EHPLMN and EPLMN list of the card 2, and if the network number of the first cell is not the RPLMN of the card 2, the card 2 is controlled to camp on other available cell.

In step S15, the card 2 searches for a network and camps on other available cell, then the process proceeds to step S16. The process that the card 2 searches for a network and camps on a cell may refer to the step S11.

In step S16, if the card 2 succeeds in camping on another cell is determined. If the determination result is YES, the process proceeds to step S17, and if NO, the process proceeds to step S21. Specifically, if the card 2 succeeds in camping on a cell other than the first cell, the card 2 registers with the cell (which is the cell other than the first cell). If the card 2 fails to camp on a cell, that is, the card 2 can not camp on any other cell normally, a restricted camp-on service is provided. By doing this, the card 2 is forced to camp on the first cell, and the card 2 can only initiate some restricted services (e.g., emergency call).

In step S17, the card 2 registers with the cell, then the process proceeds to step S18.

In step S18, if the card 2 succeeds in registering with the cell is determined. If the determination result is YES, the process proceeds to step S19, and if NO, the process proceeds to step S21. If the card 2 finishes the registration, the card 2 is turned into standby state in the cell's network. If the registration is rejected by the cell's network (e.g., payment of the card 2 is in arrears), a restricted camp-on service is provided. By doing this, the card 2 is forced to camp on the first cell, and the card 2 can only initiate some restricted services (e.g., emergency call).

In step S19, the card 1 registers with the first cell. After the registration of the card 2, the card 1 registers with the first cell. After the registration of the card 1, the cards 1 and 2 respectively camp on different cells. The card 1 is turned into the standby state or conducts a service in the first cell's network, while the card 2 is turned into the standby state or conducts a service in another cell's network.

In step S21, the card 2 camps on the first cell, then the process proceeds to step S22. If the card 2 belongs to a same operator as the card 1, or if the network number of the first cell is contained in the EHPLMN or EPLMN list of the card 2, or if the network number of the first cell is RPLMN of the card 2, or if the card 2 fails to camp on another cell, or if the registration of the card 2 is rejected by the other cell's network, the card 2 is forced to camp on the same cell as the card 1, namely, the first cell. When the card 1 searches for a network and camps on the first cell, all the system information of the first cell is received and stored by the card 1. Thus, the card 2 may access the system information of the first cell from the card 1 directly, which greatly reduces the time period for the card 2 camping on the first cell.

In step S22, the cards 1 and 2 respectively register with the first cell. If the cards 1 and 2 are able to camp on a same cell is determined, both the two cards are forced to camp on the same cell. After the cards 1 and 2 finish registration in turn, the cards 1 and 2 are standby in the first cell's network. The mobile phone monitors the Paging Channel (PCH) and may receive the paging information of the two cards simultaneously which are respectively informed to each of the two cards, which thereby increases the efficiency of paging information reception, and avoids missing the paging information.

Figure 3:
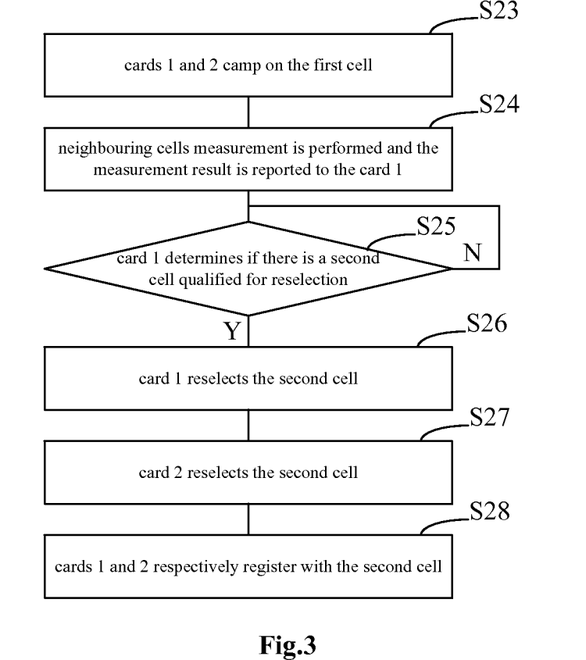
FIG. 3 is a schematic flow chart illustrating a reselection process of a synchronization method in a multi-SIM multi-standby communication terminal according to the first embodiment of the present disclosure.

FIG. 3 is a schematic flow chart illustrating a reselection process of a synchronization method in a multi-SIM multi-standby communication terminal according to the first embodiment of the present disclosure, which takes a dual-SIM dual-standby mobile phone as an example. If the cards 1 and 2 camp on the first cell after the mobile phone is powered on, both the two cards may share the measurement information of neighbouring cells, which thereby increases the efficiency of measurement. When the card 1 performs cell reselection, the card 2 may synchronously reselect the same cell that the card 1 reselects and camps on successfully. That is, upon the mobile phone being powered on, if the cards 1 and 2 are able to camp on a same cell is determined, both the two cards 1 and 2 may be kept camping on the same cell synchronously.

In step S23, the cards 1 and 2 camp on the first cell. After the cards 1 and 2 finish registration with the first cell in turn, the cards 1 and 2 are standby or conduct a service in the first cell's network.

In step S24, neighboring cells measurement is performed and the measurement result is reported to the card 1 (the main card). The physical layer performs neighboring cells measurement by measuring received signal strengths of the first cell's neighboring cells, then the measurement result is reported to the card 1. Because the cards 1 and 2 camp on the same cell, the measurement result just needs to be reported to one card, namely, the main card, which is responsible for reselection assessment. The result of neighboring cells measurement may be the result after the received signal strengths of the neighboring cells is ranked. When the mobile phone is powered on, the physical layer may measure the received signal strengths of the neighboring cells of the current cell, and the measurement result is reported to the card 1.

In step S25, the card 1 determines if there is a second cell qualified for reselection, if the determination result is YES, the process proceeds to step S26, and if NO, the process continues with the step S25. Specifically, the signal strength of the current cell that the card camps on may be weakened due to the variation of the wireless environment with the movement of the mobile phone. And there may be one neighboring cell of which the signal strength is increased gradually. Therefore, the card needs to reselect a cell which is much more suitable for camping on than the current cell. The card 1 performs reselection assessment based on the result of neighboring cells measurement that the physical layer has reported, that is, determines if there is a neighboring cell of the first cell which is qualified for reselection. The cell qualified for reselection means that the received signal strength of the neighboring cell is greater than a predetermined threshold (e.g., the minimum access threshold that is required by the network) and lasts for a predetermined time (e.g., 5 s). If there is a cell qualified for reselection, the cell is identified to be the second cell, and the process proceeds to step S26. If there is no cell qualified for reselection, the card 1 continues with reselection assessment based on the result of neighboring cells measurement that the physical layer has reported.

In step S26, the card 1 reselects the second cell. Specifically, if it is determined that there is a second cell (namely, the cell qualified for cell reselection) based on the result of neighbouring cells measurement, the card 1 reselects the second cell, that is, the card 1 attempts to receive system information of the second cell. If the card 1 receives all the system information of the second cell, and the following conditions can be conformed to based on the system information: the received signal strength of the second cell conforms to the minimum access threshold that is required by the network, the location of the second cell is not prohibited, the cell is not barred, and the network number of the second cell belongs to the same operator's network as the card 1, then the card 1 succeeds in camping on the second cell, that is, the card 1 succeeds in reselecting the second cell. When the card 1 reselects the second cell, the card 1 may store the received system information of the second cell.

In step S27, the card 2 reselects the second cell. Specifically, in the power-on process of the cell synchronization method of two cards described above, it is determined that the card 2 is able to camp on the same cell as the card 1. Accordingly, after the card 1 reselects the second cell, the card 2 is forced to camp on the cell that the card 1 camps on, namely, the second cell. Because the card 1 may have stored the received system information of the second cell after the card 1 reselects the second cell, the card 2 may access the system information of the second cell from the card 1 directly, which thereby greatly reduces the time period for the card 2 camping on the second cell.

In step S28, the cards 1 and 2 respectively register with the second cell. After the cards 1 and 2 finish registration with the second cell in turn, the cards 1 and 2 are standby in the second cell's network. The mobile phone monitors the Paging Channel (PCH) and receives the paging information of the two cards simultaneously which is respectively informed to each of the two cards, which thereby increase the efficiency of paging information reception, and avoids missing the paging information. In addition, for the cards 1 and 2, both neighbouring cells measurement and cell reselection are kept synchronous.

Figure 4:
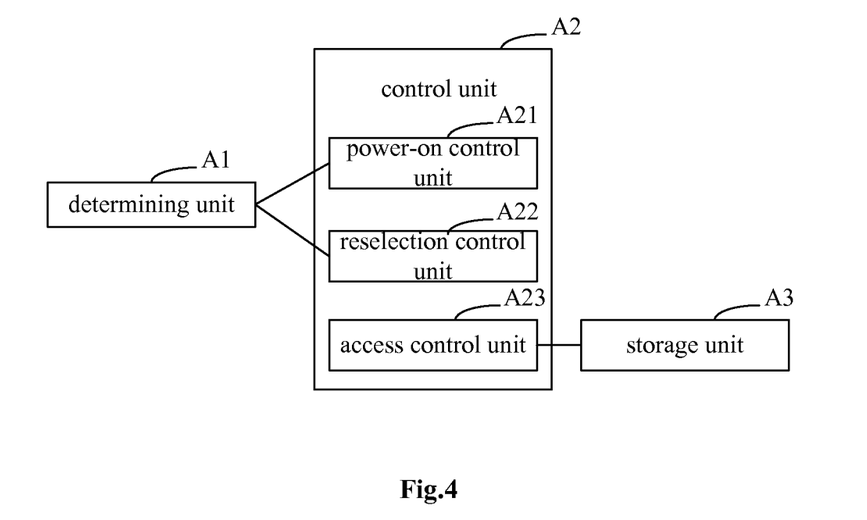
FIG. 4 is a schematic structural diagram of a synchronization device in a multi-SIM multi-standby communication terminal according to the first embodiment of the present disclosure.

Correspondingly, a synchronization device in a multi-SIM multi-standby communication terminal is also provided in one embodiment of the present disclosure. As shown in FIG. 4, the synchronization device includes: a determining unit A1 and a control unit A2.

The determining unit A1 is adapted to identify a first card, and to determine if there is a second card within the remaining cards which is suitable for camping on a same cell as the first card.

The control unit A2 is adapted, after the first card camps on a cell and if the determination result of the determining unit A1 is YES, to control the second card to camp on the cell with the first card. Further, the control unit A2 is adapted to control the second card to camp on other cell if the determination result is NO.

The basis for determination that the determining unit A2 determine if there is a second card that, includes:

(1) the second card belongs to a same operator as the first card;

(2) the network number of the cell which the first card camps on is contained in the EHPLMN list of the second card;

(3) the network number of the cell which the first card camps on is contained in the EPLMN list of the second card;

(4) the network number of the cell which the first card camps on is RPLMN of the second card;

(5) the second card fails to camp on any other cell; and (6) the registration or initiating a service by the second card is rejected by a cell's network.

The control unit A2 includes a power-on control unit A21, and a reselection control unit A22.

The power-on control unit A21 is adapted, after the first card searches for a network and camps on a first cell and if the determination result is YES, to control the second card to camp on the first cell.

The reselection control unit A22 is adapted, after the first card reselects and camps on a second cell and if the determination result is YES, to control the second card to reselect the second cell.

The synchronization device further includes a storage unit A3, which is adapted to store system information that is received by the first card when the first card camps on a cell. The control unit A2 further includes an access control unit A23, which is adapted to control the second card to access the system information stored in the storage unit A3 during the second card camps on the cell with the first card. In an optional embodiment, the synchronization device may include no storage unit. During the first card camps on a cell, the first card receives and stores the system information. The access control unit is adapted to control the second card to access the system information stored in the first card during the second card camps on the same cell with the first card.

The operation of the determining unit A1, the control unit A2 (including the power-on control unit A21, the reselection control unit A22, and the access control unit A23), and the storage unit A3 may refer to the synchronization method described above, which is not described in detail herein.

Embodiment Two

The synchronization method in a multi-SIM multi-standby communication terminal includes:

Step S3A: Determining, by a first card, if there is a second cell qualified for reselection based on the result of neighbouring cells measurement, and if the determination result is YES, the first card reselecting the second cell; and Step S4A: Controlling a second card to reselect the second cell after the first card camps on the second cell.

Figure 5:
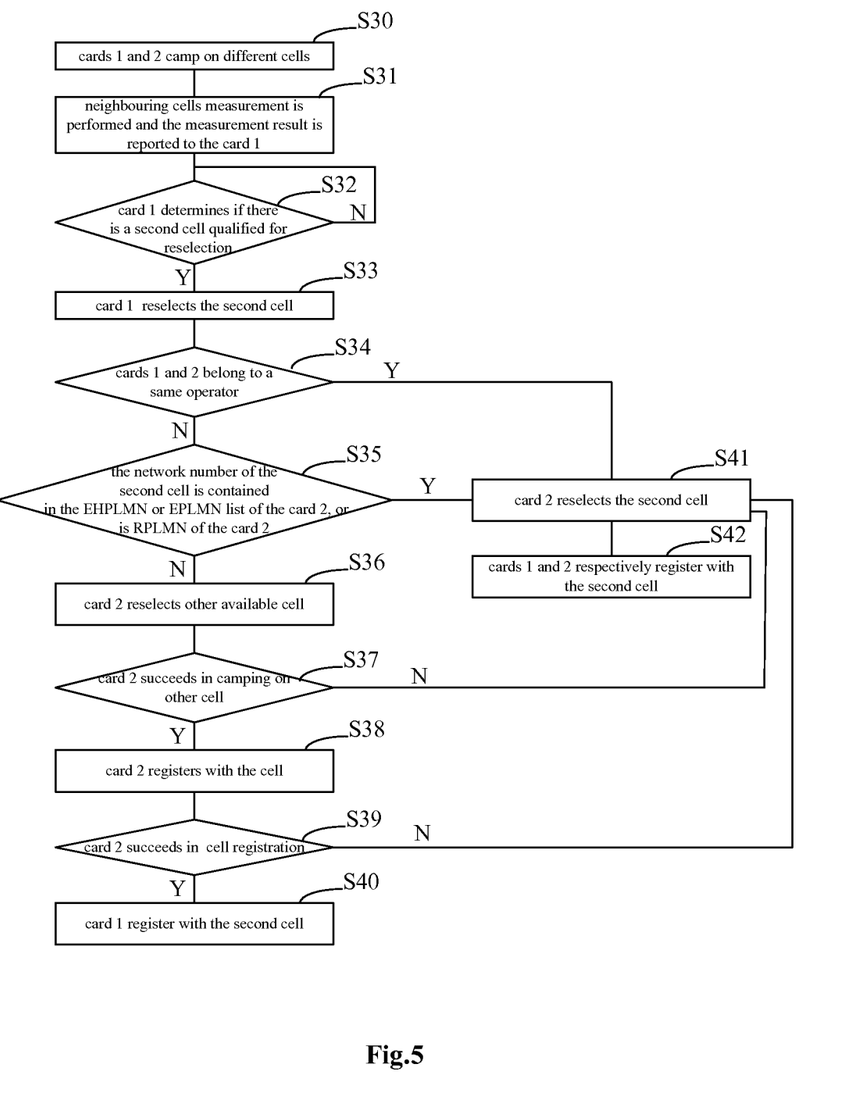
FIG. 5 is a schematic flow chart of a synchronization method in a multi-SIM multi-standby communication terminal according to a second embodiment of the present disclosure.

FIG. 5 is a schematic flow chart of a synchronization method in a multi-SIM multi-standby communication terminal according to the second embodiment of the present disclosure. In this embodiment, the synchronization method is performed to achieve the cell synchronization of dual-SIM dual-standby mobile phone in the process of reselection, but not performed in the power-on process. This embodiment has the following advantages: the efficiency of paging information reception and neighboring cells measurement is increased, power consumption is reduced, the time period for camping on the cell is reduced remarkably, and the implementation of the physical layer and reselection is simplified.

Firstly, in step S30, the cards 1 and 2 camp on different cells. After the mobile phone is powered on, the cards 1 and 2 respectively search for a network and camp on a cell. Because the two cards search for a network respectively, the two cards may camp on different cells. In this embodiment, the card which firstly searches for a network and succeeds in camping on a cell is identified to be the first card (the main card), such as the card 1. The process that the cards 1 and 2 search for a network and camp on a cell is can may refer to the step S11 of the first embodiment.

In step S31, neighboring cells measurement is performed and the measurement result is reported to the card 1. The physical layer performs neighboring cells measurement by measuring received signal strengths of the neighboring cells from the cell on which the card 1 camps currently, then the measurement result is reported to the card 1. Due to a single communication module for multi-SIM multi-standby single-communicating communication device, in order to avoid additional power consumption caused by time-division switching the two cards in turn, the main card may be preassigned to measure the neighboring cell, and the measurement result is reported to the main card for reselection assessment. The measurement result of neighboring cells may be the result after the received signal strengths of the neighboring cell is ranked. When the mobile phone is powered on, the physical layer may measure received signal strengths of the neighboring cell from the current cell, and the measurement result is reported to the card 1.

In step S32, the card 1 determines if there is a second cell qualified for reselection, if the determination result is YES, the process proceeds to step S33, and if NO, the process continues with the step S32.

In step S33, the card 1 reselects the second cell. The steps S32 and S33 may refer to the corresponding steps S25 and S26 of the first embodiment.

In step S34, it is determined if the card 2 belongs to a same operator as the card 1, if the determination result is YES, the process proceeds to step S41, and if NO, the process proceeds to step S35. After the card 1 reselects the second cell (namely, succeeds in camping on the second cell), it can be determined if the two cards belong to a same operator by reading International Mobile Subscriber Identity (IMSI) of the card 1 and card 2. If the two cards belong to a same operator, the card 2 is controlled to camp on the same cell as the card 1, that is, the card 2 camps on the second cell. If the two cards belong to different operators, it is continued to determine if the card 2 conforms to the other conditions that the card 2 may camp on the same cell as the card 1.

In step S35, it is determined if the network number of the second cell is contained in the EHPLMN or EPLMN list of the card 2, or if the network number of the second cell is RPLMN of the card 2, if the determination result is YES, the process proceeds to step S41, and if NO, the process proceeds to step S36. If the two cards belong to different operators, it is continued to determine if the card 2 conforms to other conditions that the card 2 may be controlled to camp on the same cell as the card 1, such as if the network number of the second cell is contained in the EHPLMN or EPLMN list of the card 2, or if the network number of the second cell is RPLMN of the card 2. The network number of the second cell may be obtained by reading the system information that the card 1 receives on the BCCH. The EHPLMN list of the card 2 may be obtained by reading the card 2, which may be obtained by reading non-volatile RAM (which is abbreviated as NV, and is used to retain the information to be required by the mobile phone after being powered on next time) in the mobile phone. The RPLMN of the card 2 is the last registered network, which may be obtained by reading the card 2. If the network number of the second cell is contained in the EHPLMN or EPLMN list of the card 2, or if the network number of the second cell is the RPLMN of the card 2, the card 2 is controlled to camp on the same cell as the card 1, that is, the card 2 camps on the second cell. If the network number of the second cell is not contained in the EHPLMN and EPLMN list of the card 2, and if the network number of the second cell is not the RPLMN of the card 2, the process proceeds to step S36.

In step S36, the card 2 reselects other available cell, the process proceeds to S37. In this embodiment, if the determination result of the steps S34 and S35 are NO, the process continues with the reselection of the card 2. The reselection of the card 2 includes: by measuring received signal strengths of the neighbouring cells from the cell on which the card 2 camps currently, the physical layer performs neighbouring cells measurement, then the measurement result is reported to the card 2; the card 2 determine if there is a cell qualified for reselection (which is a cell other than the second cell), if the determination result is YES, the card 2 reselects the available cell (which is much more suitable for camping on), then the process proceeds to step S37; and if NO, the card 2 continues to camp on the current cell, the reselection is finished.

In S37, if the card 2 succeeds in camping on the other cell is determined. If the determination result is YES, the process proceeds to step S38, and if NO, the process proceeds to step S41. Specifically, if the card 2 succeeds in camping on a cell other than the second cell, the card 2 registers with the cell (which is the cell other than the second cell). If the card 2 fails to camp on the cell, that is, the card 2 can not camp on any other cell normally, a restricted camp-on service is provided. By doing this, the card 2 is forced to camp on the second cell, and the card 2 can only initiate some restricted services (e.g., emergency call).

In step S38, the card 2 registers with the cell, then the process proceeds to step S39.

In step S39, if the card 2 succeeds in registering with the cell is determined.

If the determination result is YES, the process proceeds to step S40, and if NO, the process proceeds to step S41. If the card 2 finishes the registration, the card 2 is standby in the cell's network. If the registration is rejected by the cell's network (e.g., payment of the card 2 is in arrears), a restricted camp-on service is provided. By doing this, the card 2 is forced to camp on the second cell, and the card 2 can only initiate a restricted service (e.g., emergency call).

In step S40, the card 1 registers with the second cell. After the registration of the card 2, the card 1 registers with the second cell. After the registration of the card 1, the cards 1 and 2 respectively camp on different cells. The card 1 is standby or conducts a service in the second cell's network, while the card 2 is standby or conducts a service in another cell's network.

In step S41, the card 2 reselects the second cell, then the process proceeds to step S42. If the card 2 belongs to a same operator as the card 1, or if the network number of the second cell is contained in the EHPLMN or EPLMN list of the card 2, or if the network number of the second cell is RPLMN of the card 2, or if the card 2 fails to camp on other cell, or if the registration of the card 2 is rejected by the other cell's network, the card 2 is forced to camp on the same cell as the card 1, namely, the second cell. When the card 1 searches for a network and camps on the second cell, the card 1 has stored all the system information received from the second cell. As a result, the card 2 may access the system information of the second cell from the card 1 directly, which thereby greatly reduces the time period for the card 2 camping on the second cell.

In step S42, the cards 1 and 2 respectively register with the second cell. If it is determined that the cards 1 and 2 are able to camp on a same cell, the two cards are forced to camp on the same cell. After the cards 1 and 2 finish registration in turn, the cards 1 and 2 are standby in the second cell's network. The mobile phone monitors the Paging Channel (PCH) and receives the paging information of the two cards simultaneously which is respectively informed to each of the two cards, which thereby increase the efficiency of paging information reception, and avoids missing the paging information.

In addition, both the cards may share the information of neighbouring cells measurement, which thereby increases the efficiency of measurement. When the card 1 performs cell reselection, the card 2 may reselect the same cell synchronously as the card 1 reselects and camps on successfully. That is, upon the mobile phone being powered on, if it is determined that the cards 1 and 2 are able to camp on a same cell, both the cards 1 and 2 are kept camping on the same cell synchronously.

It is should noted that the steps S34 and S35 S35 may be performed prior to the step S31, that is, the steps S34 and S35 may be performed when the mobile phone is powered on, and the determination result is recorded. In this case, a new step may be added subsequent to the step S33. The new step includes: obtaining the determination result of the steps S34 and S35, if the determination result is YES, the process proceeds to the step S41, and if NO, the process proceeds to the step S36.

Corresponding to the synchronization method according to the second embodiment, a synchronization device in a multi- SIM multi-standby communication terminal is also provided. The synchronization device includes: a determining unit and a control unit.

The determining unit is adapted to identify a first card, and to determine if there is a second card within the remaining cards which is suitable for camping on a same cell as the first card.

The control unit is adapted, after the first card camps on a cell and if the determination result of the determining unit is YES, to control the second card to camp on the cell with the first card. Further, the control unit is adapted to control the second card to camp on other cell if the determination result is NO.

The control unit includes a reselection control unit which is adapted, after the first card reselects and camps on a second cell and if the determination result is YES, to control the second card to reselect the second cell.

The synchronization device further includes a storage unit, which is adapted to store system information that is received by the first card when the first card camps on a cell. The control unit further includes an access control unit, which is adapted to control the second card to access the system information stored in the storage unit during the second card camps on the cell with the first card. In an optional embodiment, the synchronization device may include no storage unit. During the first card camps on a cell, the first card receives and stores the system information. The access control unit is adapted to control the second card to access the system information stored in the first card during the second card camps on the same cell with the first card.

The operation of the determining unit, the control unit, and the storage unit may refer to the synchronization method described above, which is not described in detail herein.

Embodiment Three

The synchronization method in a multi-SIM multi-standby communication terminal includes:

Step S1A: Searching, by the first card, for a network and camping on a first cell after the communication terminal being powered on;

Step S2A: Controlling the second card to camp on the first cell, the second card suitable for camping on a same cell as the first card.

In this embodiment, the dual-SIM dual-standby mobile phone keeps cell synchronization in the power-on process, which may refer to the cell synchronization method in the power-on process described in the first embodiment shown in FIG. 1.

Corresponding to the synchronization method according to the third embodiment, a synchronization device in a multi-SIM multi-standby communication terminal is also provided. The synchronization device includes: a determining unit and a control unit.

The determining unit is adapted to identify a first card, and to determine if there is a second card within the remaining cards which is suitable for camping on a same cell as the first card.

The control unit is adapted, after the first card camps on a cell and if the determination result of the determining unit is YES, to control the second card to camp on the same cell as the first card. Further, the control unit is adapted to control the second card to camp on other cell if the determination result is NO.

The control unit includes a power-on control unit which is adapted, after the first card searches for a network and camps on a first cell, and if the determination result is YES, to control the second card to camp on the first cell.

The synchronization device further includes a storage unit, which is adapted to store system information that is received by the first card when the first card camps on a cell. The control unit further includes an access control unit, which is adapted to control the second card to access the system information stored in the storage unit during the second card camps on the same cell with the first card. In an optional embodiment, the synchronization device may include no storage unit. During the first card camps on a cell, the first card receives and stores the system information. The access control unit is adapted to control the second card to access the system information stored in the first card during the second card camps on the same cell with the first card.

The operation of the determining unit, the control unit, and the storage unit may refer to the synchronization method described above, which is not described in detail herein.

It should be noted that a dual-SIM dual-standby communication terminal is employed to describe the synchronization method and device in the aforementioned embodiments of the present disclosure. In fact, the synchronization method and device in the aforementioned embodiments may be applicable to the multi-SIM multi-standby communication terminal. If the first card (main card) succeeds in camping on a cell, as long as the cell is suitable for other cards (one or more cards which are referred to as a second card) to camp on, the one or more cards may be forced to camp on the same cell as the first card, then the multiple cards camping on the same cell register with the cell in turn.

Further, embodiments of the present disclosure provide a multi-SIM multi-standby communication terminal including the synchronization device described above. In practical application, the synchronization device may be embedded in the baseband processing chip in the multi-SIM multi-standby communication terminal, which cooperates with the RF chip to achieve the synchronization method described in the above embodiments.

In summary, embodiments of this disclosure have the following advantages: the efficiency of paging information reception and neighbouring cells measurement is increased, power consumption is reduced, the time period for camping on the cell is reduced remarkably, and the implementation of the physical layer and reselection is simplified.

Although the present disclosure has been disclosed above with reference to preferred embodiments thereof, it should be understood that the disclosure is presented by way of example only, and not limitation. Those skilled in the art can modify and vary the embodiments without departing from the spirit and scope of the present disclosure.

What is claimed is:

1. A synchronization method in a multi-SIM multi-standby communication terminal, comprising:
   a first card of the communication terminal camping on a first cell;
   determining whether a second card of the communication terminal belongs to a same operator as the first card;
   if the second card of the communication terminal does not belong to the same operator as the first card, determining whether the network number of the first cell is contained in the EHPLMN or EPLMN list of the second card, or whether the network number of the first cell is RPLMN of the second card;
   if the second card of the communication terminal belongs to the same operator as the first card, or if the network number of the first cell is contained in the EHPLMN or EPLMN list of the second card, or if the network number of the first cell is RPLMN of the second card, controlling the second card to camp on the first cell with the first card; and if the network number of the first cell is not contained in the EHPLMN or EPLMN list of the second card, or if the network number of the first cell is not RPLMN of the second card, controlling the second card to camp on a second cell.

2. The synchronization method according to claim 1, further comprising:

determining, by the first card, if there is a third cell qualified for reselection based on the result of neighboring cells measurement;

if there is the third cell qualified for reselection, the first card reselecting the third cell; and determining whether the second card belongs to a same operator as the first card;

if the second card of the communication terminal does not belongs to the same operator as the first card, determining whether the network number of the third cell is contained in the EHPLMN or EPLMN list of the second card, or whether the network number of the third cell is RPLMN of the second card;

if the second card of the communication terminal belongs to the same operator as the first card, or if the network number of the third cell is contained in the EHPLMN or EPLMN list of the second card, or if the network number of the third cell is RPLMN of the second card, controlling the second card to camp on the third cell with the first card; and if the network number of the third cell is not contained in the EHPLMN or EPLMN list of the second card, or if the network number of the third cell is not RPLMN of the second card, the second card camping on a fourth cell.

3. The synchronization method according to claim 1, wherein the first card is the one which firstly searches for a network and camps on the cell after the communication terminal is powered on.

4. The synchronization method according to claim 1, wherein the first card is a preassigned card.

5. The synchronization method according to claim 1, wherein the first card receives and stores system information when the first card camps on the first cell; and controlling the second card to camp on the same cell with the first card comprises controlling the second card to access the stored system information.

6. A synchronization device in a multi-SIM multi-standby communication terminal, comprising:

a determining unit, adapted to identify a first card, and to determine if there is a second card within the remaining cards which is suitable for camping on a same cell as the first card; and a control unit, after the first card camps on the first cell and if a second card within the remaining cards is suitable for camping on the same cell as the first card, adapted to control the second card to camp on the first cell with the first card;

wherein the determining unit determining if a second card within the remaining cards which is suitable for camping on the same cell as the first card comprises:

determining whether the second card belongs to the same operator as the first card; and if the second card of the communication terminal does not belong to a same operator as the first card, determining whether a network number of the first cell is contained in the EHPLMN or EPLMN list of the second card, or whether the network number of the first cell is RPLMN of the second card.

7. The synchronization device according to claim 6, wherein the control unit comprises a reselection control unit, after the first card reselects and camps on a second cell, and if the second card within the remaining cards is suitable for camping on the same cell as the first card, adapted to control the second card to reselect the second cell.

8. The synchronization device according to claim 7, wherein the control unit comprises a power-on control unit, after the first card searches for the network and camps on the third cell, and if the second card within the remaining cards is suitable for camping on the same cell as the first card, adapted to control the second card to camp on the third cell.

9. The synchronization device according to claim 6, wherein the first card is the one which firstly searches for the network and camps on the same cell after the communication terminal is powered on.

10. The synchronization device according to claim 6, wherein the first card is a preassigned card.

11. A synchronization device in a multi-SIM multi-standby communication terminal, comprising:

a determining unit, adapted to identify a first card, and to determine if there is a second card within the remaining cards which is suitable for camping on a same cell as the first card; and a control unit, after the first card camps on a first cell and if the second card within the remaining cards is suitable for camping on the same cell as the first card, adapted to control the second card to camp on the first cell with the first card, wherein the second card conforms to the following conditions:

firstly, the second card belongs to a same operator as the first card;

secondly, a network number of the first cell which the first card camps on is contained in the EHPLMN list of the second card;

thirdly, the network number of the first cell which the first card camps on is contained in the EPLMN list of the second card;

fourthly, the network number of the first cell which the first card camps on is RPLMN of the second card;

fifthly, the second card fails to camp on any other cell; and sixthly, the registration or initiating a service by the second card is rejected by a cell's network.

12. The synchronization device according to claim 6, wherein the synchronization device further comprises a storage unit, adapted to store system information that is received by the first card when the first card camps on the cell; and the control unit is further adapted to control the second card to access the stored system information when the second card camps on the first cell with the first card.

13. The synchronization device according to claim 6, wherein the control unit is further adapted to control the second card to camp on a fourth cell if the a second card within the remaining cards is not suitable for camping on the same cell as the first card.

14. A multi-SIM multi-standby communication terminal, comprising the synchronization device according to claim 6, wherein the synchronization device comprises:

the determining unit, adapted to identify the first card, and to determine if there is the second card within the remaining cards which is suitable for camping on the same cell as the first card; and the control unit, after the first card camps on the first cell and if the second card within the remaining cards is suitable for camping on card within the remaining cards which is suitable for camping on the same cell as the first card comprises:
  determining whether the second card belongs to the same operator as the first card; and
  if the second card of the communication terminal does not belong to the same operator as the first card, determining whether the network number of the first cell is contained in the EHPLMN or EPLMN list of the second card, or whether the network number of the first cell is RPLMN of the second card.

15. The multi-SIM multi-standby communication terminal according to claim 14, wherein the communication terminal further comprises a baseband processing chip and a radio frequency chip, and the synchronization device is embedded in the baseband processing chip.

16. The multi-SIM multi-standby communication terminal according to claim 14, wherein the multi-SIM multi-standby communication terminal is a dual-SIM dual-standby communication terminal.

17. The synchronization method according to claim 1, further comprising:
  determining whether or not the second card succeeds in camping on the second cell;
  if the second card succeeds in camping on the second cell, determining whether or not the second card succeeds in registering with the second cell; and
  if the second card fails to camping on the second cell, or if the second card fails to register with the second cell, controlling the second card to camp on the first cell with the first card.

18. The synchronization device according to claim 13, wherein the determining unit determining if a second card within the remaining cards is suitable for camping on the same cell as the first card further comprises:
  determining whether or not the second card succeeds in camping on the fourth cell; and
  if the second card succeeds in camping on the fourth cell, determining whether or not the second card succeeds in registering with the fourth cell.

19. The multi-SIM multi-standby communication terminal according to claim 14, wherein the control unit is further adapted to control the second card to camp on a second cell if a second card within the remaining cards is not suitable for camping on the same cell as the first card;
  the determining unit determining if a second card within the remaining cards is suitable for camping on the same cell as the first card further comprises:
  determining whether or not the second card succeeds in camping on the second cell; and
  if the second card succeeds in camping on the second cell, determining whether or not the second card succeeds in registering with the second cell.

* * * * *